United States Patent [19]

Sainen

[11] Patent Number: 5,134,568
[45] Date of Patent: Jul. 28, 1992

[54] METHOD FOR CONTROLLING THE ROTATIONAL FREQUENCY OF WEAVING MACHINE UTILIZING FUZZY INFERENCE

[75] Inventor: Tsutomu Sainen, Kanazawa, Japan

[73] Assignee: Tsudakoma Kogyo Kabushiki Kaisha, Kanazawa, Japan

[21] Appl. No.: 477,338

[22] Filed: Feb. 8, 1990

[30] Foreign Application Priority Data

Feb. 8, 1989 [JP] Japan .................... 1-27590

[51] Int. Cl.⁵ .............................. G06F 15/46
[52] U.S. Cl. ....................... 364/470; 139/105; 395/900
[58] Field of Search .............. 364/470, 513; 139/1 R, 139/1 E, 71, 97, 99, 105, 110, 304, 336, 452

[56] References Cited

U.S. PATENT DOCUMENTS

| 4,875,184 | 10/1989 | Yamakawa | 307/494 |
| 4,899,286 | 2/1990 | Colli et al. | 364/470 |
| 4,958,288 | 9/1990 | Takahashi | 364/426.04 |
| 4,961,225 | 10/1990 | Hisano | 364/807 |
| 5,060,161 | 10/1991 | Sainen | 364/470 |

FOREIGN PATENT DOCUMENTS 0382490 8/1990 European Pat. Off. ............ 364/470

Primary Examiner—Jerry Smith
Assistant Examiner—Thomas E. Brown
Attorney, Agent, or Firm—Ware, Fressola, Van Der Sluys & Adolphson

[57] ABSTRACT

A control method for a weaving machine comprises the steps of obtaining the rotational frequency to be varied by the use of the fuzzy interference on the basis of the evaluation index representing the running condition level of the weaving machine, and then varying the actual rotational frequency of the weaving machine on the basis of the obtained rotational frequency. As the evaluation index, use is made of the control allowance level of the weaving machine, the quality allowance level of woven fabric, the working allowance level of the operator, the stop level of the weaving machine, the rate of a change value of the stop level to a variation value of the rotational frequency or the operating rate of the weaving machine.

11 Claims, 16 Drawing Sheets

FIG. I

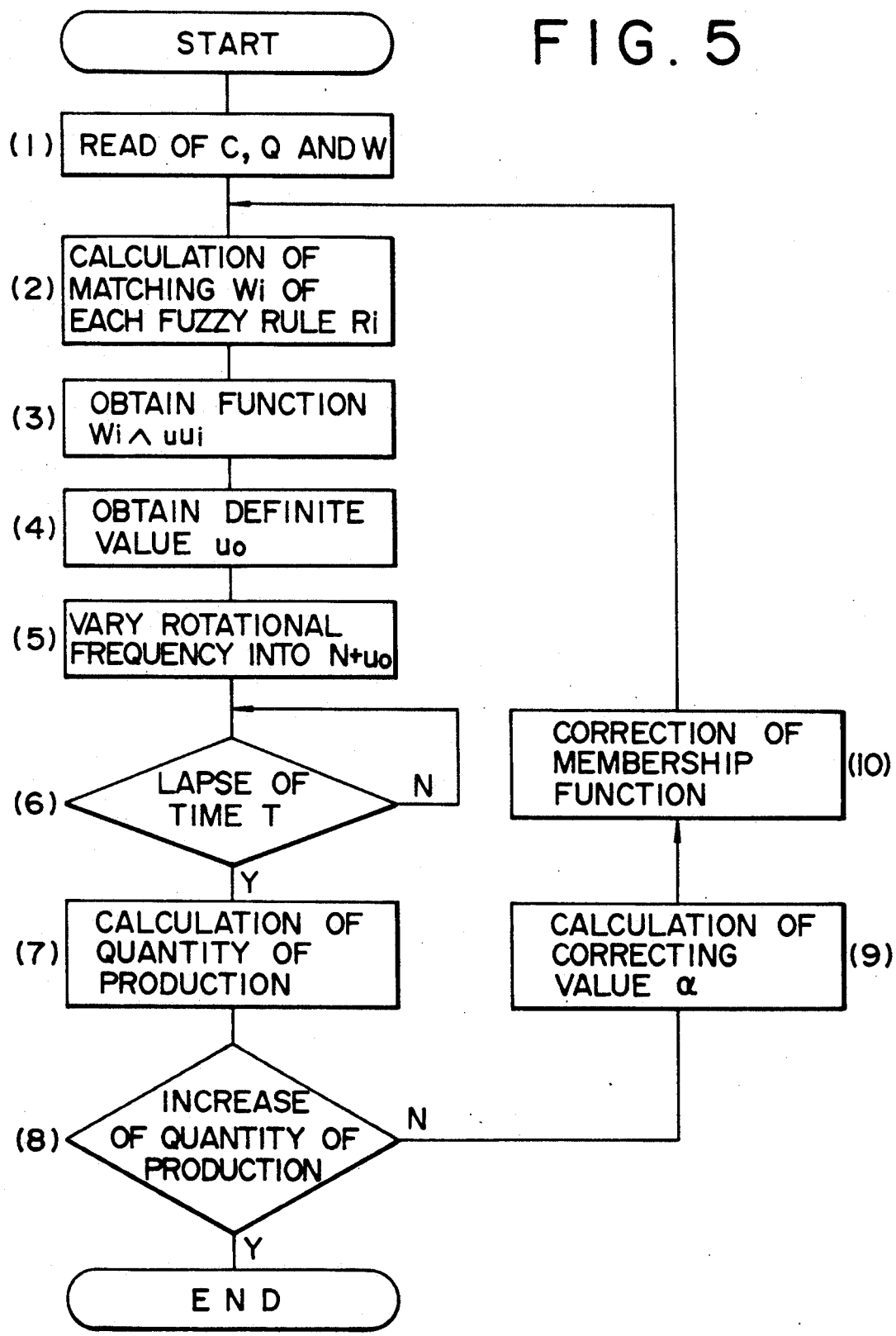

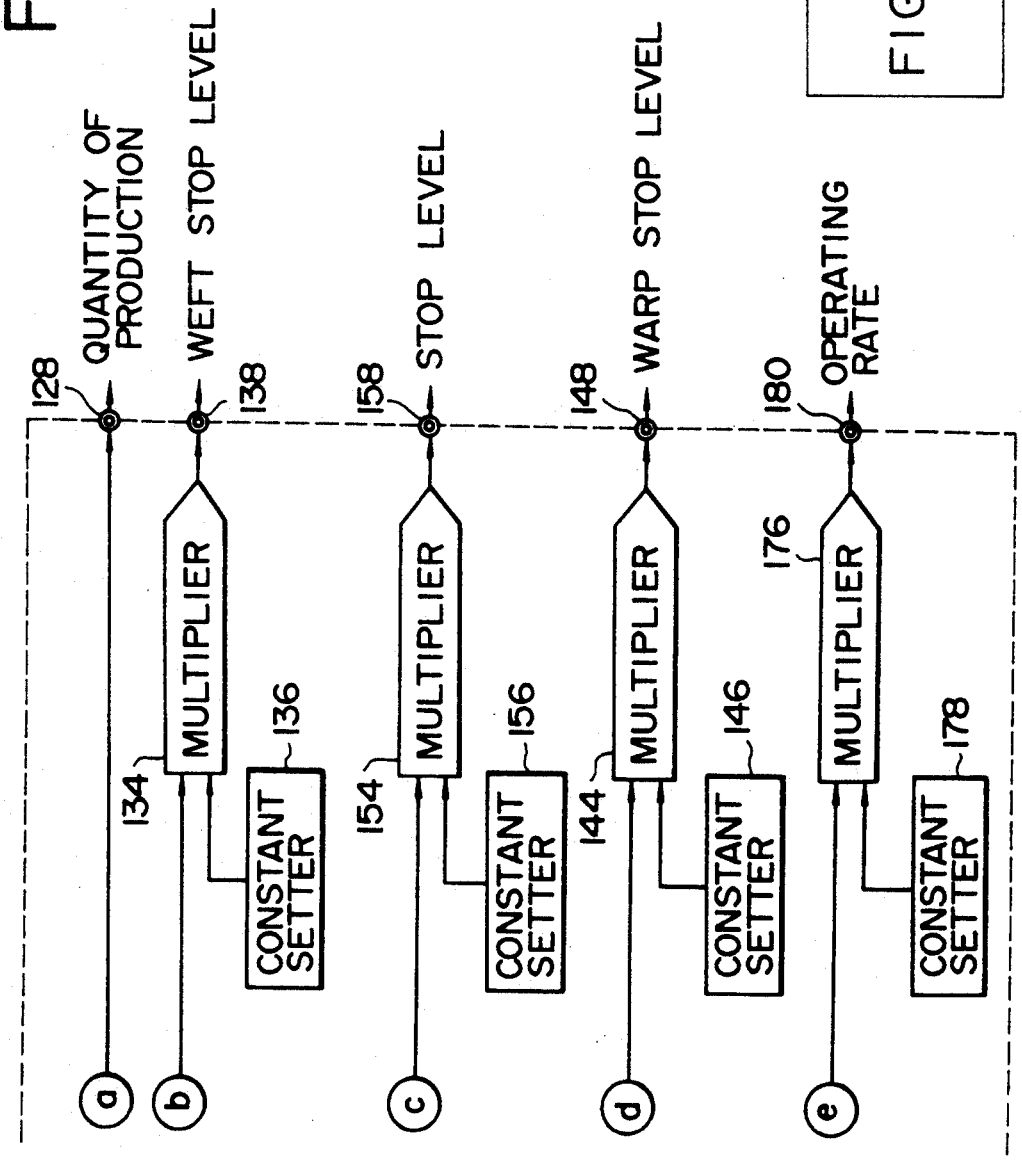

FIG. 12(A) 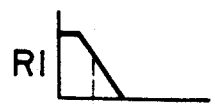 
FIG. 12(B)  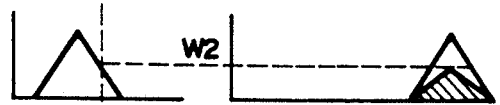
FIG. 12(C) 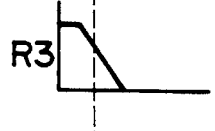 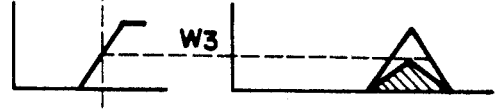
FIG. 12(D)  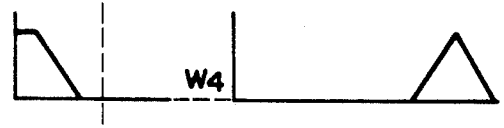
FIG. 12(E)  
FIG. 12(F) 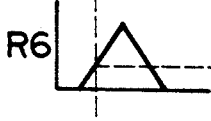 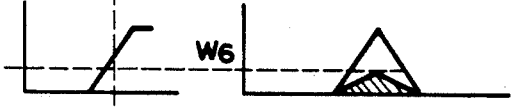
FIG. 12(G)  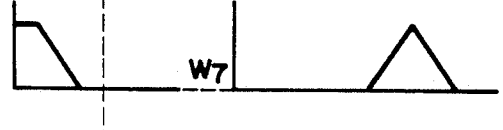
FIG. 12(H) 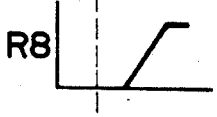 
FIG. 12(I) 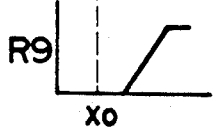 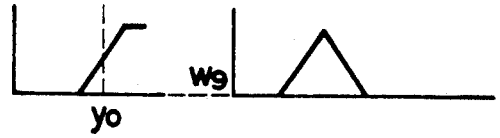
FIG. 12(J) $\mu U(u)$ 

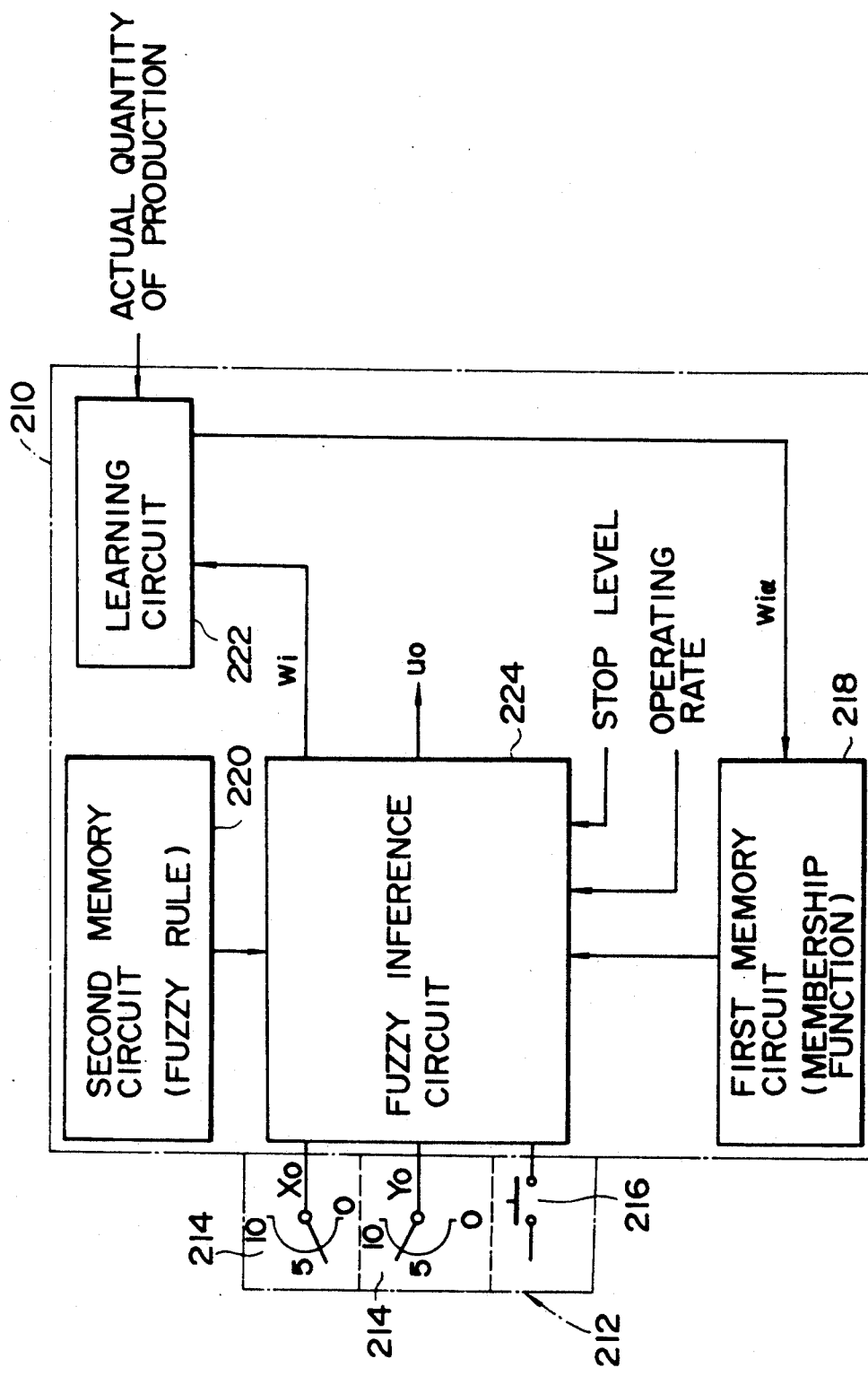

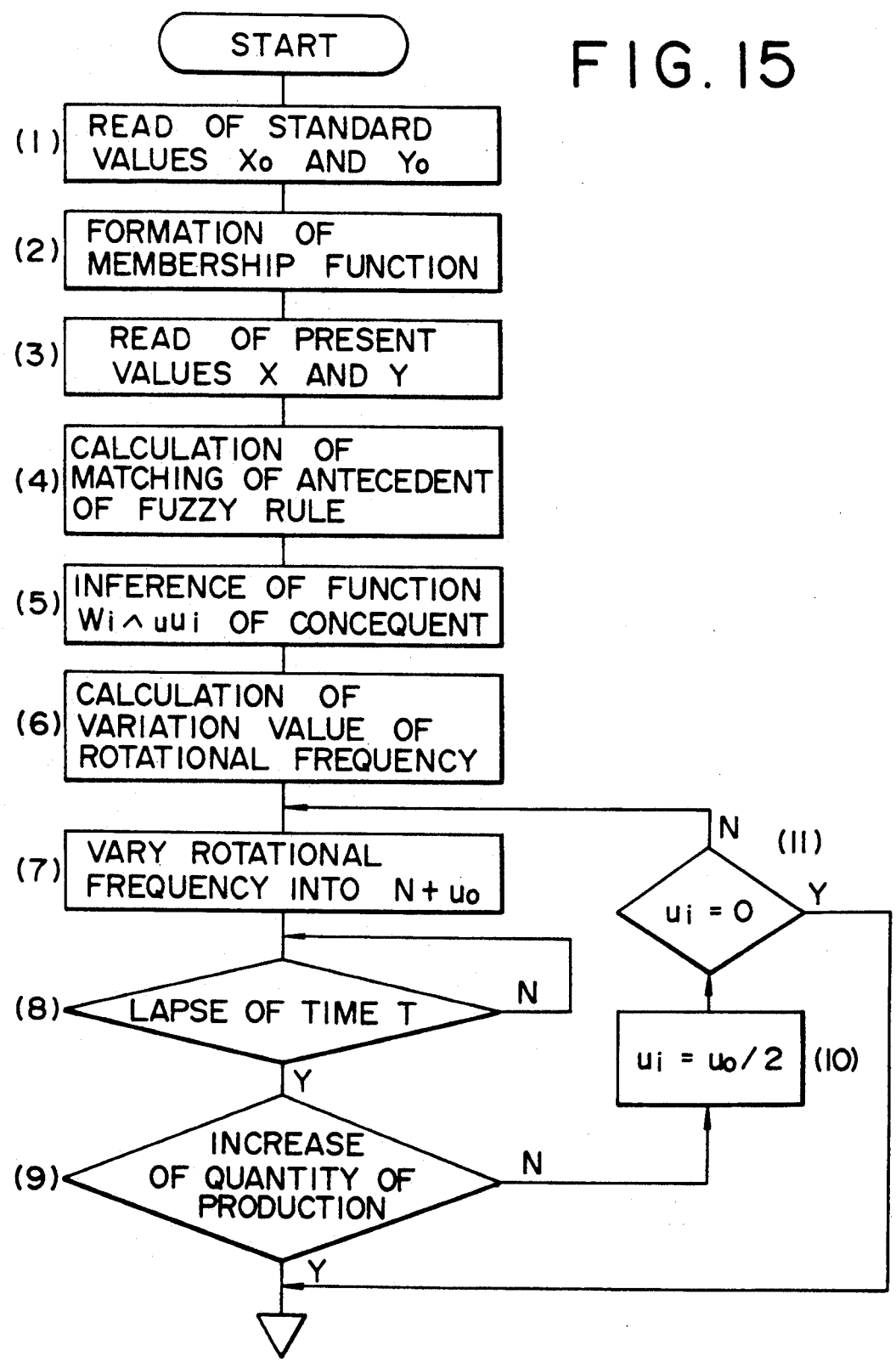

METHOD FOR CONTROLLING THE ROTATIONAL FREQUENCY OF WEAVING MACHINE UTILIZING FUZZY INFERENCE

BACKGROUND OF THE INVENTION

1. Field of the Invention

This invention relates to a method for controlling the rotational frequency of a weaving machine and an apparatus therefor and, more particularly, to a method for controlling the rotational frequency of a weaving machine so as to increase the quantity of production and an apparatus therefor.

2. Description of the Prior Art

In a weaving machine, the rotational frequency to maximize the quantity of production depends upon not only the kind of the weaving machine and resultant woven fabric, but also upon the skill of an operator and the tolerance limit of the quality of woven fabric or the like. Thus, in the weaving machine, there is the case where the quantity of production is reduced by increasing the rotational frequency while there is another case where the quantity of production is increased by reducing the rotational frequency.

The above cases take place for the reason that since end breakage of warp and unsatisfactory weft insertion are liable to occur by increasing the rotational frequency, the number of times of stop, or the stop frequency, of the weaving machine caused by the end breakage of warp and unsatisfactory weft insertion is increased. When the stop frequency of the weaving machine is increased, the working allowance of the operator and the operating rate of the weaving machine are reduced thus resulting in the further reduction in quantity of production, and besides, the degradation in quality of woven fabric occurs.

As one of weaving machine control methods which permit the quantity of production to increase by controlling the rotational frequency of a weaving machine, Japanese Patent Public Disclosure (KOKAI) No. 61-239057 (U.S. Pat. No. 4,736,324, EP-A-0182382) has disclosed a method of increasing the rotational frequency of a weaving machine when an allowance is made for the operating rate of the weaving machine.

According to this conventional control method, however, since the rotational frequency is increased only when the operating rate is less than the upper limit thereof, it is unobvious how much the allowance to be made for the operating rate and, in consequence, how much the rotational frequency should be increased. Thus, in the conventional control method, if a variation value of the rotational frequency is defined as an extensive value, the control becomes unstable, so that the rotational frequency should be increased by small degrees, and a lot of time is required before the quantity of production is actually increased.

SUMMARY OF THE INVENTION

It is an object of the present invention to provide a method for controlling a weaving machine and an apparatus therefor, which permit the rotational frequency of the weaving machine to be corrected into the optimum rotational frequency sufficient for the increase in quantity of production in a short period of time.

A method for controlling the rotational frequency of a weaving machine according to the present invention comprises the steps of obtaining the rotational frequency to be varied utilizing the fuzzy inference on the basis of the evaluation index representing the running condition level of the weaving machine, and then varying the actual rotational frequency of the weaving machine on the basis of the obtained rotational frequency.

An apparatus for controlling the rotational frequency of a weaving machine according to the present invention comprises fuzzy inference means for obtaining the rotational frequency to be varied utilizing the fuzzy inference on the basis of the evaluation index representing the running condition level of the weaving machine, and means for varying the actual rotational frequency of the weaving machine on the basis of the rotational frequency obtained by the fuzzy inference means.

According to the present invention, since the rotational frequency to be varied is obtained by the use of the fuzzy inference on the basis of the evaluation index representing the running condition level of the weaving machine, the optimum value sufficient for the increase in quantity of production is obtained in a short period of time, so that the rotational frequency is permitted to be corrected into the optimum rotational frequency sufficient for the increase in quantity of production.

The evaluation index may be obtained by setting with a setter, or by detecting the running condition of the weaving machine and then calculating the running condition level on the basis of the detected value.

If a variation value of the quantity of production per unit hour is obtained after the actual rotational frequency is varied, and then a membership function used in the fuzzy inference is corrected on the basis of the obtained variation value of the quantity of production per unit hour, the membership function is automatically corrected so as to ensure the increase of the quantity of production. Further, it is preferable that the rotational frequency to be varied is again obtained by utilizing the fuzzy inference on the basis of the corrected membership function, and then the actual rotational frequency of the weaving machine is again varied on the basis of the obtained rotational frequency. If the quantity of production is not increased although the actual rotational frequency is varied, the rotational frequency of the weaving machine is corrected such that the quantity of production is surely increased.

If the evaluation index is set utilizing of a variable resistor, the evaluation index, which is vague in contour, is easily set.

As the evaluation index, the working allowance level of an operator is preferably set in a setter connected in common to a plurality of weaving machines operated by one operator. Thereby, since the evaluation index is set only for one weaving machine, the operation of setting the evaluation index is alleviated in comparison with the case where the evaluation index is set for each weaving machine.

At least one of the following variables may be used as the evaluation index: the control allowance level of the weaving machine, the quality allowance level of the woven fabric, the working allowance level of the operator, the stop level of the weaving machine, the rate of a change value of the stop level with respect to a variation value of the rotational frequency, and the operating rate of the weaving machine.

The fuzzy inference means is provided with a first memory circuit, in which a plurality of membership functions are stored, a second memory circuit, in which a plurality of fuzzy rules are stored, and a fuzzy inference circuit for obtaining the rotational frequency to be varied on the basis of the evaluation index, the membership functions and the fuzzy rules.

The control apparatus further comprises means for inputting a start command of the operation to the fuzzy inference means.

BRIEF DESCRIPTION OF THE DRAWINGS

The foregoing and other objects and features of the invention will become apparent from the following description of preferred embodiments of the invention with reference to the accompanying drawings, in which:

FIG. 5 is a flow chart for explaining the operation of the fuzzy controller shown in FIG. 3;

FIGS. 8(A) and 8(B) are views showing an embodiment of an operation monitor in the control apparatus shown in FIG. 1;

FIGS. 12(A) to 12(J) are views for explaining the fuzzy inference by the fuzzy controller shown in FIG. 9;

FIG. 13 is a block diagram showing a further embodiment of the fuzzy controller;

FIG. 15 is a flow chart for explaining the operation of the fuzzy controller shown in FIG. 13.

DETAILED DESCRIPTION OF THE PREFERRED EMBODIMENTS

Figure 1:
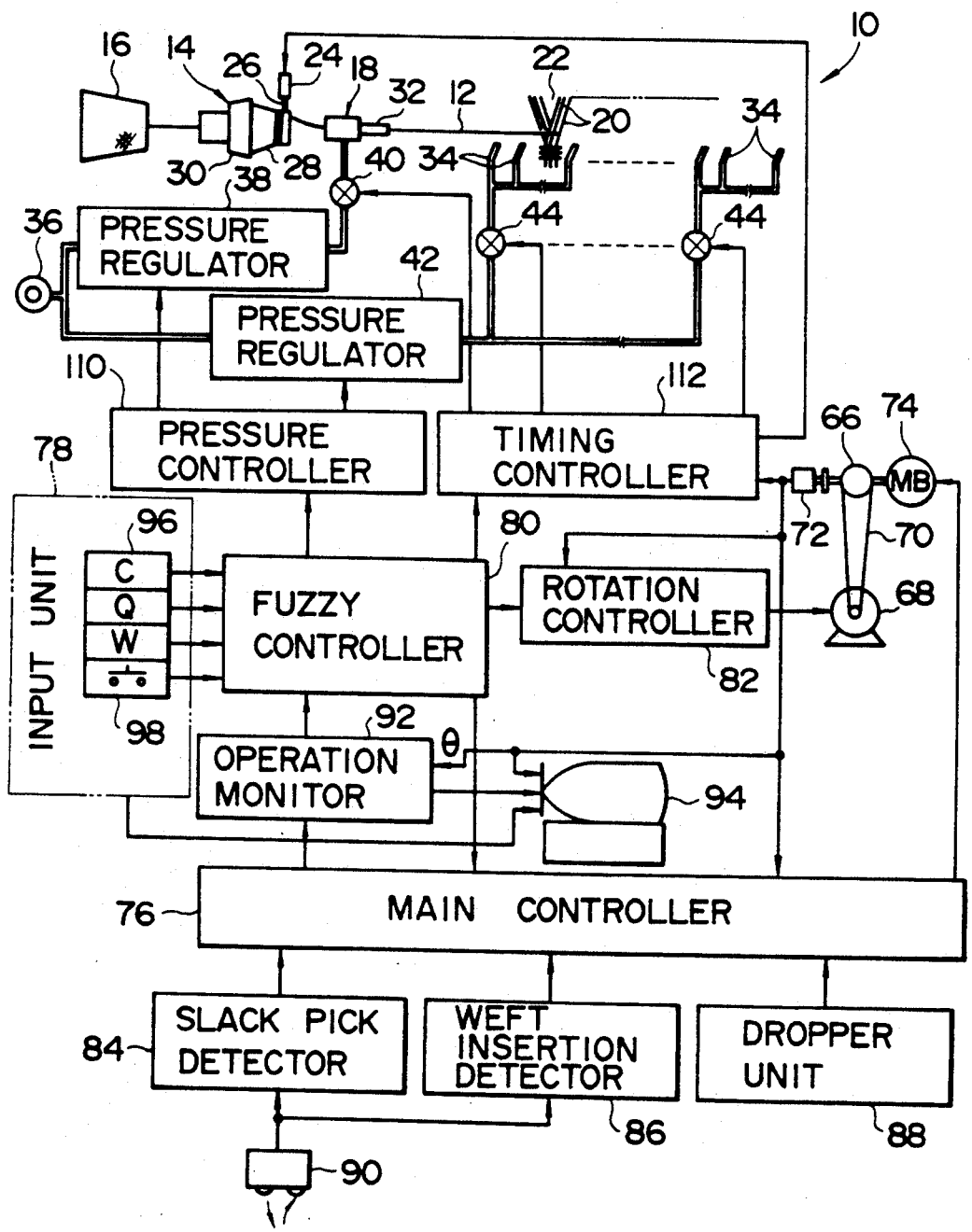
FIG. 1 is a view showing an embodiment of a weaving machine using a control apparatus according to the present invention.

Referring to FIG. 1, a weaving machine 10 includes a rotary length-measuring storage unit 14 for weft 12. The weft 12 is rolled around a feed body 16. The weft 12 is also fed from the feed body 16 to a well-known weft inserting unit 18 through the length-measuring storage unit 14 to be inserted into a shed 22 of warp 20 by the weft inserting unit 18.

In the length measurement, the weft 12 has the tip held against the outer peripheral surface of a drum 28 used both for length-measurement and storage by a pin 26 operated by a solenoid 24, and is rolled around the outer peripheral surface of the drum 28 by a predetermined length with the rotation of a yarn guide 30 to be stored by the drum 28. On the other hand, in the weft insertion, the weft 12 is released from the pin 26, and together with fluid, is directed from a main nozzle 32 of the weft inserting unit 18 for insertion into the shed 22 of the warp 20. The weft inserting unit 18 includes a plurality of sub nozzles 34 for jetting the fluid for putting the weft 12 in a predetermined direction in the weft insertion.

Working fluid from a pressure source 36 is supplied to the main nozzle 32 through a pressure regulator 38 and a switch valve 40. On the other hand, the working fluid of the pressure source 36 is supplied to each sub nozzle 34 through a pressure regulator 42 and a switch valve 44.

Figure 2:
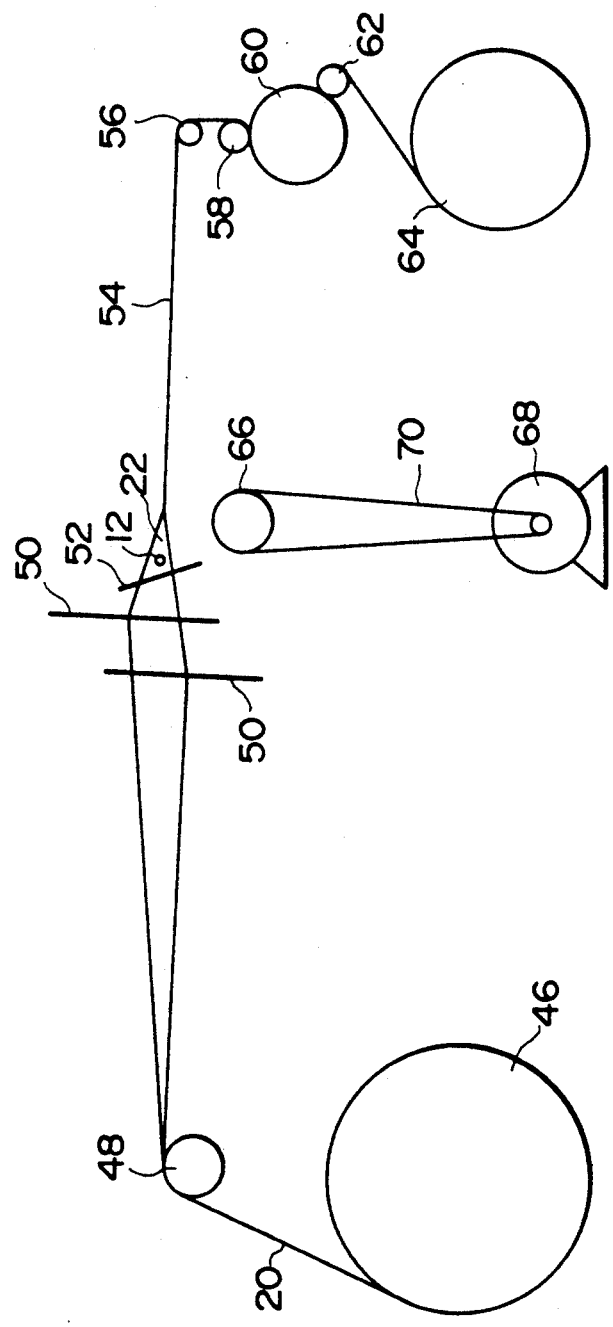
FIG. 2 is a schematic view showing a route of warp of the weaving machine shown in FIG. 1.

As shown in FIG. 2, each warp 20 is rolled around a letting-off beam 46. The warp 20 from the letting-off beam 46 is fed to a weaving section through a tension roller 48. In the weaving section, the shed 22 of the warp 20 is formed by a plurality of healds 50, and then the weft 12 is inserted into the shed 22. Then, the weft 12 inserted into the shed 22 is beat up against a cloth fell by a reed 52 to be woven into a fabric 54. The woven fabric 54 is rolled around a take-up beam 64 through a presto beam 56, a guide roller 58, a take-up roller 60 and a guide roller 62.

The weaving machine 10 further includes a motor 68 for a main shaft 66 for operating the reed 52. The rotation of the motor 68 is transmitted to the main shaft 66 through a connecting mechanism 70. The main shaft 66 is connected to an encoder 72 for generating a rotational angle signal corresponding to the rotational angle of the main shaft 66, and an electromagnetic brake 74 for the main shaft 66. The length-measuring storage unit 14, the weft inserting unit 18, the letting-off beam 46, the healds 50, the reed 52 and the take-up roller 60 are operated in synchronism with the rotation of the main shaft 66.

An apparatus for controlling the weaving machine 10 comprises a main controller 76, an input unit 78 for setting the evaluation index representing the running condition level of the weaving machine 10, a fuzzy controller 80 for obtaining the rotational frequency to be varied by utilizing a fuzzy inference on the basis of the evaluation index set in the input unit 78, and a rotation controller 82 for rotating the motor 68 at the predetermined rotational frequency on the basis of an output signal of the fuzzy controller 80.

The main controller 76 receives an output signal of a well-known slack pick detector (See Japanese Patent Public Disclosure (KOKAI) No. 63-92578) 84 for generating a slack pick signal to the effect that slack pick occurs in the weft 12, an output signal of a well-known weft insertion detector 86 for generating a weft stop signal to the effect that weft insertion is not done, an output signal of a well-known dropper unit 88 for generating a warp stop signal to the effect that the warp 20 is subjected to end breakage, an output signal of the encoder 72, and an output signal of the fuzzy controller 80. Each of the slack pick detector 84 and the weft insertion detector 86 generates a predetermined electric signal on the basis of an output signal of a well-known weft sensor 90 for generating an electric signal corresponding to the presence or absence of the weft 12.

The main controller 76 executes the sequence control necessary for various controls of the length measurement of the weft 12, the storage and insertion of the weft 12, the letting-off motion of the warp 20, the operation of the heald 50, the take-up motion of the woven fabric 54 and the starting and stopping operations of various units constituting the weaving machine on the basis of the respective input signals and control information stored in an internal memory. Also, the main controller 76 outputs to an operation monitor 92, a running signal to the effect that whether or not the weaving machine 10 is in a running condition.

The operation monitor 92 calculates the quantity of produced woven fabric 54, the weft stop level caused by the stop of the weft 12, the warp stop level caused by the stop of the warp 20, the weaving machine stop level serving as the whole stop level of the weaving machine and the operating rate of the weaving machine 10 or the like on the basis of the rotational angle signal supplied from the encoder 72 and the weft stop signal, the warp stop signal and the weaving machine running signal supplied from the main controller 76, whereby these stop levels are supplied to a display monitor 94, while the quantity of produced woven fabric is supplied to the fuzzy controller 80.

The quantity of produced woven fabric 54 is obtained by counting the number of revolutions of the main shaft 66 on the basis of the rotational angle signal, for example. On the other hand, the weft stop level, the warp stop level and the weaving machine stop level are defined as the weaving machine stop frequency, i.e., the number of times of stop of the weaving machine per unit production quantity of the woven fabric 54, per unit length of the woven fabric, per unit pick number or per unit operating time. Thus, weft stop level, the warp stop level and the weaving machine stop level are obtained on the basis of the rotational angle signal, the weft stop signal, the warp stop signal and the weaving machine running signal. Further, since the operating rate is defined as the rate of the operating time of the weaving machine 10 in relation to the sum of the operating time of the weaving machine and the stop time thereof caused by the weaving machine stop level, the operating rate is obtained on the basis of the weaving machine running signal.

The input unit 78 is provided with a plurality of setters 96 individually made to correspond to the evaluation indexes, and a push-button switch 98 for inputting an operation start command to the fuzzy controller 80. A value set in each setter 96 is supplied to the display monitor 94, in addition to the fuzzy controller 80.

In the embodiment shown in FIGS. 1 through 7, as the evaluation index representing the running condition level of the weaving machine, the following levels are utilized the control allowance level C of the weaving machine to the effect that this weaving machine will work well even if the rotational frequency is increased; the quality allowance level Q of the woven fabric to the effect that this machine will ensure the quality of the woven fabric even if the rotational frequency is increased; and the working allowance level W of the operator to the effect that the operator is likely to sufficiently cope with the operation of this weaving machine even if the rotational frequency is increased.

The control allowance level C may be another concept such as the rotational frequency is too large or too small or the like, for example. Similarly, the quality allowance level Q and the working allowance level W may be other concepts to the effect that the quality is too good or too bad or the like, and that the operator has too much or too little allowance for the operation or the like, respectively.

Each setter 96 is a variable resistor for analogically setting the corresponding evaluation index. Each evaluation index is defined as a desired value ranging from 0 to 10, wherein the evaluation index is defined as 0 when the corresponding allowance is not made at all, the evaluation index is defined as 5 when it can not be not said that the allowance is either made or made, and the evaluation index is defined as 10 when the large allowance is made, for example.

Further, as each setter 96, use is also made of another type of a setter such as a digital switch for outputting decimal in the form of a binary code may be utilized. Also, since the working allowance of one operator is set in common for each weaving machine operated by the same operator, the setter for setting the working allowance is possible to be used in common for a plurality of weaving machines operated by one operator.

As the evaluation level, other evaluation indexes may also being utilized such as the weft stop level, the warp stop level, the weaving machine stop level, the rate of the change value of the weaving machine stop level with respect to the variation value of the rotational frequency, and the operating rate of the weaving machine. These evaluation indexes are set corresponding to the levels thereof similarly to the above mentioned manner in use.

Figure 3:
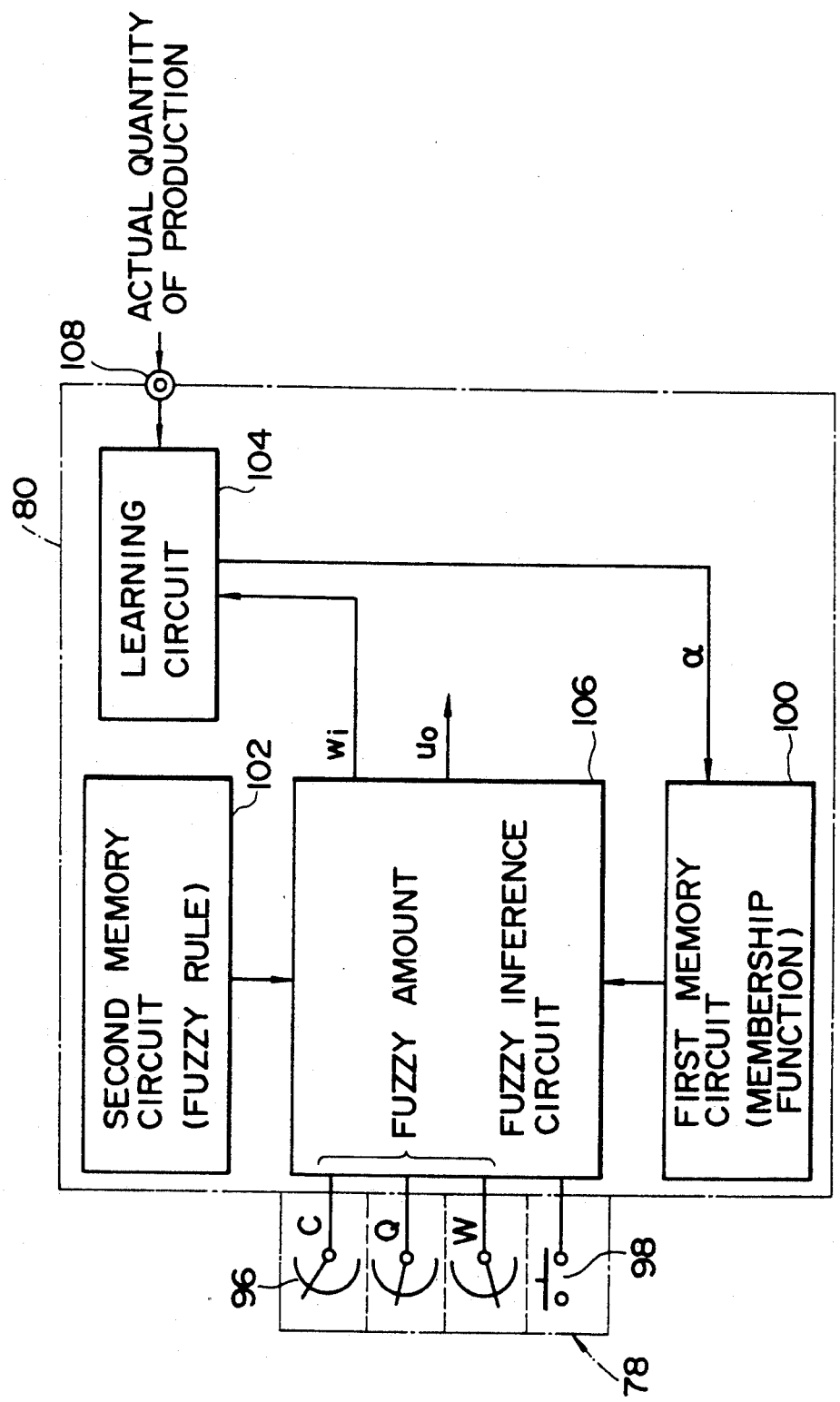
FIG. 3 is a block diagram showing an embodiment of a fuzzy controller.

As shown in FIG. 3, the fuzzy controller 80 is provided with a first memory circuit 100, in which a plurality of membership functions B, S, PB, PS, NS and NB are stored, a second memory circuit 102, in which a plurality of fuzzy rules $R_1$ through $R_8$ are stored, a learning circuit 104 for correcting the membership functions, and a fuzzy inference circuit 106 for obtaining the rotational frequency $u_0$ to be varied on the basis of each information stored in the first and second memory circuits 100 and 102, and the evaluation index, i.e., fuzzy amount set in the input unit 78.

Figure 4A:
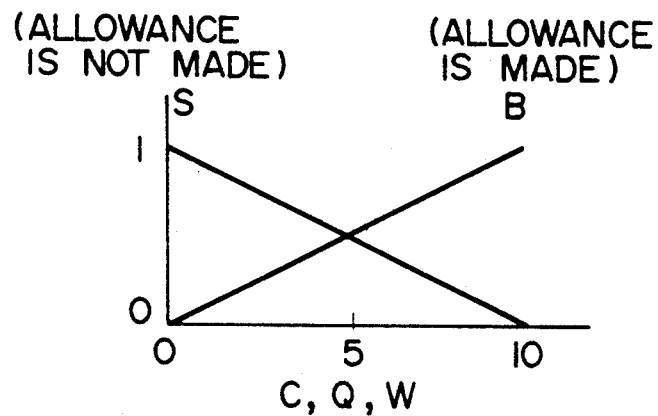
FIGS. 4(A) and 4(B) are graphs showing an embodiment of the membership function used for the fuzzy controller shown in FIG. 3.

As shown in FIG. 4(A), the membership functions B and S are respectively defined as the functions corresponding to the respective languages such as the allowance is made and the allowance is not made with respect to the evaluation indexes C, Q and W, and also represent the certainty, in which each evaluation index belongs to the set of each language. These membership functions B and S are used for the inference to the effect that how much the set evaluation index matches with the antecedent of each fuzzy rule, which will be later described, i.e., the matching inference. In the illustrated embodiment, the membership functions B and S are stored so as to be used in common for each evaluation index, while they are stored every one evaluation index. In the latter case, the membership functions B and 3 are defined as values different from each other every one evaluation index.

Figure 4B:
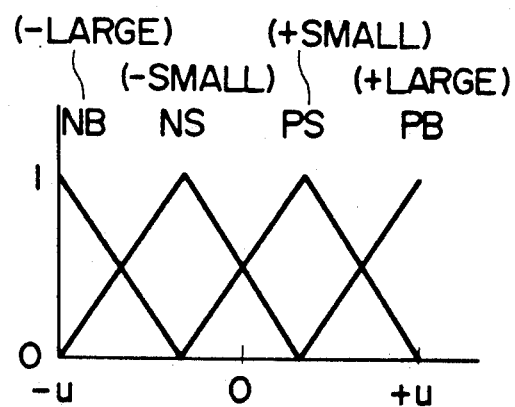

On the other hand, as shown in FIG. 4(B), the membership functions PB, PS, NS and NB are respectively defined as the functions corresponding to the respective languages such as largely increase the rotational frequency, increase the rotational frequency, reduce the rotational frequency and largely reduce the rotational frequency, and also represent the certainty, in which the rotational frequency to be varied belongs to the set of each language. These membership functions PB, PS, NS and NB are used when inferring the consequent of each fuzzy rule, which will be later described, on the basis of the above matching.

The fuzzy rules $R_1$ through $R_8$ stored in the second memory circuit 102 are defined respectively as follows:

$R_1$: If the allowance is made for the control allowance level C of the weaving machine (B), the allowance is made for the quality allowance level Q (B), and the allowance is made for the working allowance level W (B), then largely increase the rotational frequency of the weaving machine PB).

$R_2$: If the allowance is made for the control allowance level C of the weaving machine (B), the allowance is made for the quality allowance level Q (B), and the allowance is not made for the working allowance level W (S), then increase the rotational frequency of the weaving machine (PS).

$R_3$: If the allowance is made for the control allowance level C of the weaving machine (B), the allowance is not made for the quality allowance level Q (S), and the allowance is made for the working allowance level W (B), then increase the rotational frequency of the weaving machine (PS).

$R_4$: If the allowance is made for the control allowance level C of the weaving machine (B), the allowance is not made for the quality allowance level Q (S), and the allowance is not made for the working allowance level W (S), then reduce the rotational frequency of the weaving machine (NS).

$R_5$: If the allowance is not made for the control allowance level C of the weaving machine (S), the allowance is made for the quality allowance level Q (B), and the allowance is made for the working allowance level W (B), then increase the rotational frequency of the weaving machine (PS).

$R_6$: If the allowance is not made for the control allowance level C of the weaving machine (S), the allowance is made for the quality allowance level Q (B), and the allowance is not made for the working allowance level W (S), then reduce the rotational frequency of the weaving machine (NS).

$R_7$: If the allowance is not made for the control allowance level C of the weaving machine (S), the allowance is not made for the quality allowance level W (S), and the allowance is made for the working allowance level W (B), then increase the rotational frequency of the weaving machine (NS).

$R_8$: If the allowance is not made for the control allowance level C of the weaving machine (S), the allowance is not made for the quality allowance level Q (S), and the allowance is not made for the working allowance level W (S), then largely reduce the rotational frequency of the weaving machine (NB).

The learning circuit 104 confirms the variation of the quantity of production per unit hour on the basis of the actual quantity of production input from the operation monitor 92 to a terminal 108, and corrects the membership functions PB, PS, NS and NB stored in the first memory circuit 100 when the quantity of production per unit hour is not increased although the actual rotational frequency N of the weaving machine 10 is varied by a value corresponding to the rotational frequency $u_0$ to be varied, which is obtained through the inference in the fuzzy inference circuit 106.

The fuzzy controller 80 infers the rotational frequency $u_0$ to be varied, and supplies the inferred rotational frequency $u_0$ to the rotation controller 82. Further, as shown in FIG. 1, the fuzzy controller 80 notifies a pressure controller 110 and a timing controller 112 of the rotational frequency.

The pressure controller 110 controls the pressure regulators 38, 42 on the basis of a signal supplied from the fuzzy controller 80 so as to regulate the pressure of working fluid supplied from the pressure source 36 to the main nozzle 32 and each sub nozzle 34 of the weft inserting unit 18. On the other hand, the timing controller 112 controls the solenoid 24 on the basis of the signal supplied from the fuzzy controller 80 so as to regulate the switch valves 40 and 44 for the working fluid.

Next will be explained the operation of the fuzzy controller 80 with reference to FIG. 5.

When the switch 98 is operated, the fuzzy controller 80 first reads the evaluation indexes C, Q and W set in the respective setters 96 (Step 1).

Next, the degree of fuzzy controller 80 obtains the matching of the evaluation indexes C, Q and W with respect to the antecedent of each of the fuzzy rules $R_1$ through $R_8$, i.e., the degree of matching $w_1$ through $w_8$ for each fuzzy rule by utilizing the read out evaluation indexes C, Q and W, the membership functions B and S stored in the first memory circuit 100 and the fuzzy rules $R_1$ through $R_8$ stored in the second memory circuit 102 (Step 2).

Then, the fuzzy controller 80 infers the consequent of each of the fuzzy rules $R_1$ through $R_8$, i.e., each of the functions $w_1 \lambda \mu U_1$ through $w_8 \lambda \mu U_8$ for each fuzzy rule by the use of the obtained degrees of matching $w_1$ through $w_8$, the membership functions PB, PS, NS and NB stored in the first memory circuit 100 and the fuzzy rules $R_1$ through $R_8$ stored in the second memory circuit 102 (Step 3). In Step 3, $\mu U_1$ through $\mu U_8$ represent respectively the membership functions set in the consequents of the fuzzy rules, and a symbol $\lambda$ represents the calculation of a minimum value (common portion).

The respective degrees of matching $w_1$ through $w_8$ and the respective functions $w_1 \lambda \mu U_1$ through $w_8 \lambda \mu U_8$ are obtained as shown in FIGS. 6(A) through 6(H). For instance, referring to the fuzzy rule $R_1$, the degrees of matching of values $c_0$, $q_0$ and $w_0$ of the set evaluation indexes C, Q and W to the membership functions B and S set for the antecedent corresponding to the evaluation indexes C, Q and W are respectively obtained, and the common portion of the respective degrees of matching, i.e., the minimum degree of matching is defined as the degree of matching $w_1$ corresponding to the antecedent of the fuzzy rule $R_1$. Thereafter, the membership function PB set in the consequent of the fuzzy rule $R_1$ is cut or truncated, by the degree of matching $w_1$ to obtain the minimum value (common portion) of the degree of matching $w_1$ and the membership function PB. Thus, the function $w_1 \lambda \mu U_1$ in the fuzzy rule $R_1$ is inferred. The inferred function $w_1 \lambda \mu U_1$ is shown as hatched portion in FIG. 6(A). Following the inference of the function in the fuzzy rule $R_1$, similarly, the functions $w_2 \lambda \mu U_2$ through $w_8 \lambda \mu U_8$ in the fuzzy rules $R_2$ through $R_8$ are respectively inferred.

Figure 6A:
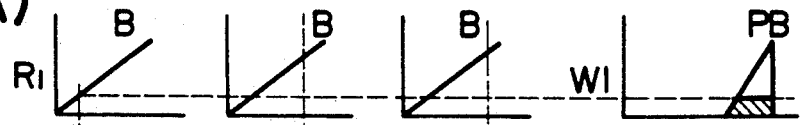
FIGS. 6(A) to 6(I) are views for explaining the fuzzy inference by the fuzzy controller shown in FIG. 3.
Figure 6B:
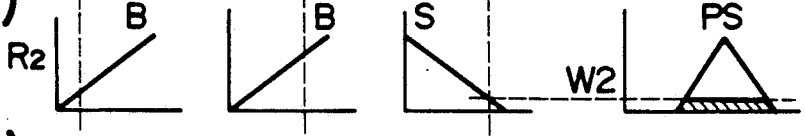
Figure 6C:
Figure 6D:
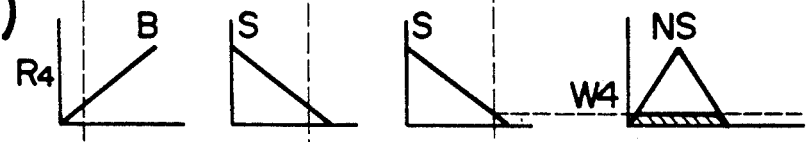
Figure 6E:
Figure 6F:
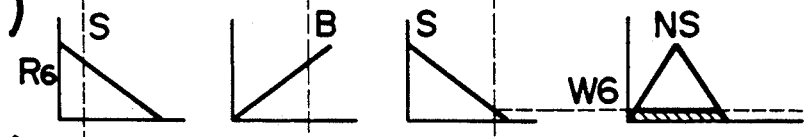
Figure 6G:
Figure 6H:
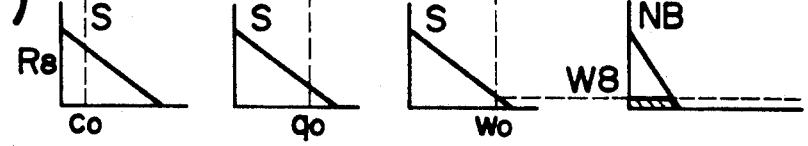
Figure 6I:
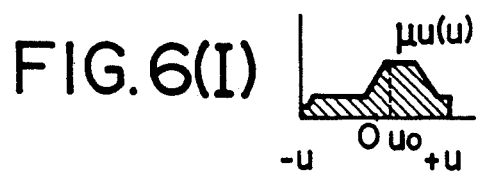

Next, the fuzzy controller 80 obtains the composite membership function, i.e., the fuzzy set $\mu U(u)$ composed of the obtained functions $w_1 \lambda \mu U_1$ through $w_8 \lambda \mu U_8$ through superposition, as shown in FIG. 6(I), and thereafter obtains a value of the center of mass of the fuzzy set $\mu U(u)$. This value of the center of mass is a value on the abscissa, which is enough to halve the area of the composite membership function, and the fuzzy controller 80 defines this value as a definite value $u_0$ resulting from the inference of the whole fuzzy rules $R_1$ through $R_8$, i.e., as the rotational frequency $u_0$ to be varied (Step 4).

The fuzzy set $\mu U(u)$ and the definite value $u_0$ are respectively obtained by the following formulae:

$$\mu U(u) = V(w_i \lambda \mu U_i) \tag{1}$$

$$u_0 = \int u \cdot \mu U(u) du \div \int \mu U(u) du \tag{2}$$

wherein V represents the calculation of a maximum value, and i represents an integer ranging from 1 to 8. Further, the fuzzy set $\mu U(u)$ and the definite value $u_0$ may be obtained by another method.

Next, the fuzzy controller 80 supplies to the rotation controller 82 a signal which makes the rotational frequency of the weaving machine vary from the actual rotational frequency N by the definite value $u_0$ (Step 5). Accordingly, the rotation controller 82 controls the motor 68 such that the rotational frequency of the weaving machine results in $N+u_0$.

After the lapse of a predetermined period of time T, the fuzzy inference circuit 106 calculates the quantity of production per unit hour, and confirms the variation of the quantity of production (Steps 6, 7 and 8). If the quantity of production per unit hour is increased, the operation of varying the rotational frequency is completed.

However, if the quantity of production per unit hour is not increased, the fuzzy controller 80 translates the membership functions PB, PS, NS and NB stored in the first memory circuit 100 by a certain value, or a value $\alpha$, proportional to the decrease in quantity of production (Steps 9 and 10), and then executes the respective Steps 2 through 8 as noted above.

Figure 7A:
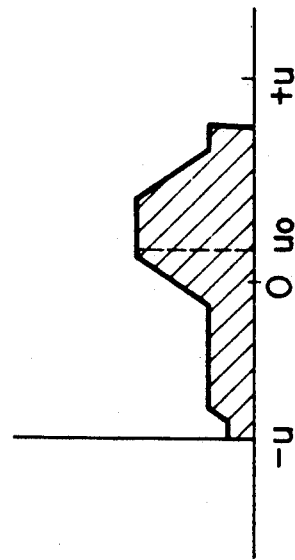
FIGS. 7(A) to 7(D) are graphs for explaining a method for correcting the membership function by the fuzzy controller shown in FIG. 3.
Figure 7B:
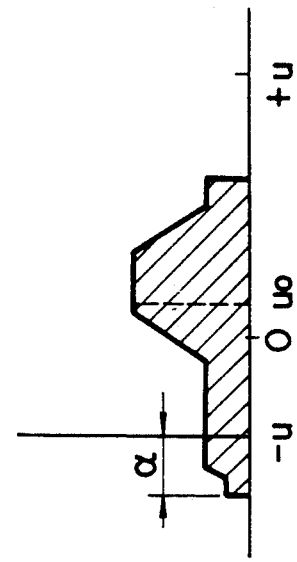
Figure 7C:
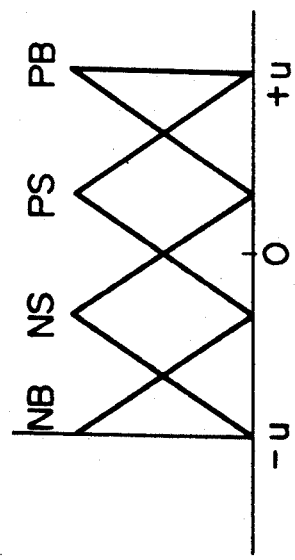
Figure 7D:
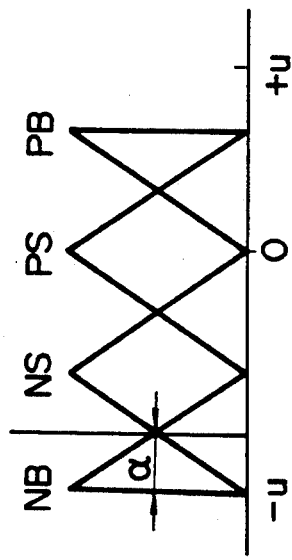

In the correction of the membership functions PB, PS, NS and NB, these membership functions are translated along the abscissa by the value $\alpha$ from the condition shown in FIG. 7(A) into the condition shown in FIG. 7(B). As a result, the fuzzy set $\mu U(u)$ and the definite value $u_0$ are varied from the position shown in FIG. 7(C) to the position shown in FIG. 7(D).

If the definite value $u_0$ obtained in Step 5 is positive, the membership functions PB, PS, NS and NB, the fuzzy set $\mu U(u)$ and the definite value $u_0$ are translated to the left as shown in FIG. 7 if the definite value $u_0$ is negative, these membership functions, the fuzzy set and the definite value are translated to the right.

The variation amount $\alpha$ of each of the membership functions PB, PS, NS and NB may be constant for each membership function. Preferably, however the variation amount $\alpha$ is changed for each membership function such that the greater membership function is varied the greater the rule affects the determination of the definite value $u_0$, for example. In this case, the degree of matching $w_i$ for each rule, or the degree of matching $w_i$ of the rule to be greatly varied may be supplied from the fuzzy inference circuit 106 to the learning circuit 104.

In steps 9 and 10, instead of the correction of the membership function, the rotational frequency of the weaving machine may be corrected by an amount less than the definite value $u_0$, i.e., by the half in inverse relation (negative or positive) to the correction (positive or negative) in Step 5.

Further, after the execution of Step 10, instead of the repetition of Steps 2 through 8, after the operation of varying the rotational frequency is completed, and then the operator confirms with the display monitor 94 as to whether or not the quantity of production is increased, the operator may operate again the switch 98 after the correction of the membership functions.

Furthermore, the operation of varying the rotational frequency may be executed at a predetermined periodic rate.

Figure 8A:
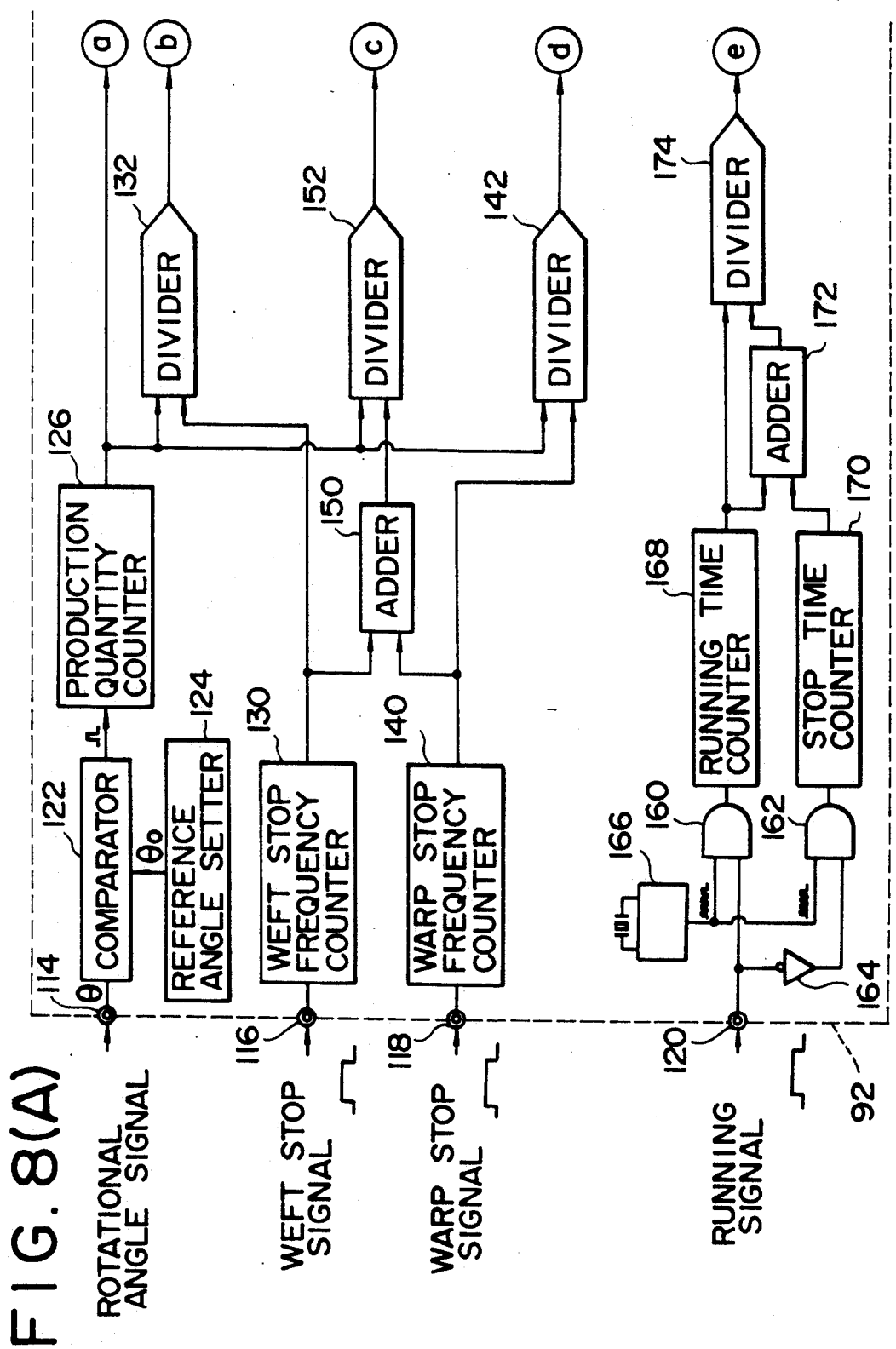

Next will be explained one embodiment of the operation monitor 92 with reference to FIG. 8(A) and 8(B).

The operation monitor 92 has terminals 114, 116, 118 and 120 respectively receiving the main shaft rotational angle signal supplied from the encoder 72 for the main shaft 66, and the weft stop signal, the warp stop signal and the weaving machine running signal supplied from the main controller 76.

The rotational angle signal $\Theta$ is supplied to a comparator 122. In the comparator 122, the rotational angle signal $\Theta$ is compared with a reference angle, i.e., 0 degrees set in a reference angle setter 124. The comparator 122 outputs a pulse signal when the rotational angle signal is considered to be the reference angle. This pulse signal is counted in a counter 126. Since the pulse signal is output every time the rotational angle signal comes to a predetermined value, the count value of the counter 126 is output from a terminal 128 as the information representing the quantity of production.

The weft stop signal is supplied to a counter 130 for obtaining the stop frequency caused by the weft. The count value of the counter 130 is supplied to a divider 132 as a signal representing the weft stop frequency. In the divider 132, the count value of the counter 130 is divided by a value corresponding to the quantity of production supplied from the counter 126. An output signal of the divider 132 is multiplied in a multiplier 134 by a value set in a setter 136 to obtain the weft stop frequency per unit production quantity (for instance, one hundred thousand picks). An output signal of the multiplier 134 is output from a terminal 138 as a signal representing the weft stop level.

On the other hand, the warp stop signal is supplied to a counter 140 for obtaining the stop frequency caused by the warp. The count value of the counter 140 is supplied to a divider 142 as a signal representing the warp stop frequency. In the divider 142, the count value of the counter 140 is divided by the value corresponding to the quantity of production supplied from the counter 126. An output signal of the divider 142 is multiplied in a multiplier 144 by a value set in a setter 146 to obtain the warp stop frequency per production quantity (for instance, one hundred thousand picks). An output signal of the multiplier 144 is output from a terminal 148 as a signal representing the warp stop level.

The count value of the counter 130 and that of the counter 140 are added by an adder 150 for obtaining the weaving machine stop frequency caused by the weft and warp. A value output from the adder 150 is supplied to a divider 152. In the divider 152, the output value from the adder 150 is divided by the value corresponding to the quantity of production supplied from the counter 126. A value output from the divider 152 is multiplied in a multiplier 154 by a value set in a setter 156 to obtain the weaving machine stop frequency per unit production quantity (for instance, one hundred thousand picks). An output value of the multiplier 154 is output from a terminal 158 as a signal representing the weaving machine stop level caused by the weft and warp.

The running signal is supplied to one input terminal of AND gate 160 having two input terminals, and also to one input terminal of another AND gate 162 having two input terminals through an inverter 164. A clock signal of a fixed frequency is supplied from an oscillator 166 to the other input terminal of the AND gate 160 and that of the AND gate 162. An output signal of the AND gate 160 and that of the AND gate 162 are counted respectively by counters 168 and 170. Since the AND gate 160 is opened only when the weaving machine is in an operating condition, the count value of the counter 168 represents the actual running time, i.e., the actual operating time of the weaving machine. On the other hand, the count value of the counter 170 represents the stop time of the weaving machine since the AND gate 162 is opened only when the weaving machine is not in an operating condition.

The count values of counters 168 and 170 are added by an adder 172, and the resultant value is supplied to a divider 174. In the divider 174, the count value of the counter 168 is divided by a value supplied from the adder 172 to obtain the operating rate, and thereafter the resultant value is multiplied in a multiplier 176 by a fixed value (one hundred) set in a setter 178. An output signal of the multiplier 176 is output from a terminal 180 as information representing the operating rate.

Information obtained from the terminals 128, 138, 148 and 180 is displayed on the display monitor 94.

A value set in each of the setters 136, 146 and 156 may be defined as one hundred (100,000), for example. On the other hand, a value set in the setter 178 is defined as one hundred (100).

Further, the weft stop level, the warp stop level and the weaving machine stop level may be defined as the stop frequency per unit length of the woven fabric, or per unit operating time.

Next will be explained another embodiment of the fuzzy controller.

In the previously described embodiment, the control allowance level C, the quality allowance level Q and the working allowance level W are used as the evaluation indexes. Since these evaluation indexes are set by grasping the running condition levels of the weaving machine with an extensive concept, every condition of the weaving machine is reflected in the control, whereas since the concept is too extensive, it is difficult to set the evaluation indexes. Namely, when setting each evaluation index, the operator is permitted to into consideration various parameters controlling the evaluation index with the extensive concept. Therefore, if a well experienced operator who is able to take even various parameters into consideration sets the evaluation index, the optimum rotational frequency control is realized. However, the concept is too large for a less-experienced operator to set the optimum evaluation index. Further, it is difficult for even the well experienced operator to set the optimum evaluation index.

Hence, in this embodiment, the evaluation index is permitted to be set easily by defining the evaluation index as the more specific and more typical evaluation index.

The control allowance level C, the quality allowance level Q and the working allowance level W all relate to the stop frequency caused by the weft and warp or the like.

Namely, the control allowance level C can be grasped by the stop frequency such as the weft stop frequency and the warp stop frequency. Also, the quality allowance level Q can be grasped by the occurrence of the cloth scar. Since the cloth scar almost occurs in relation to the stop of the weaving machine such as the weft stop and the warp stop, the occurrence of the cloth scar is reflected on the stop frequency. Further, if the weaving machine is provided with the well-known slack pick detector 84, the slack pick of weft is detected to permit the weaving machine to be stopped, so that the slack pick condition of weft is reflected on the stop frequency. Furthermore, the working allowance level W can be grasped by a time (hereinafter will be referred to as waiting time) taken from a period of time when the weaving machine is stopped to a period of time when the operator starts the repairs. The greater the stop frequency is, the longer the waiting time is, so that this waiting time is reflected on the stop frequency. If this waiting time becomes long, the operating rate is reduced, so that this waiting time also is reflected on the operating rate of the weaving machine.

Since each of the allowance levels C, Q and W are related to the stop frequency as noted above, the weaving machine stop level serving as the weaving machine stop frequency caused by the weft and warp per unit production quantity or per unit hour is used as the evaluation index representing the running condition of the weaving machine.

When obtaining the rotational frequency of the weaving machine which is enough to maximize the quantity of production, it is preferable to take the rate of the change value of the stop level to the variation of the rotational frequency into consideration. Namely, in general, when the rotational frequency is increased, the stop level is increased. However, there is a case where a decrease in quantity of production caused by the increase of the stop level exceeds an increase in quantity of production caused by the increase of the rotational frequency according to the degree of increase of the stop level, so that the quantity of production is decreased as a whole. The greater the rate as noted above is, the greater the tendency to decrease the quantity of production is. This rate is indefinite as long as the rotational frequency is actually varied, although the operator may predict this rate to a certain degree by experience.

Figure 9:
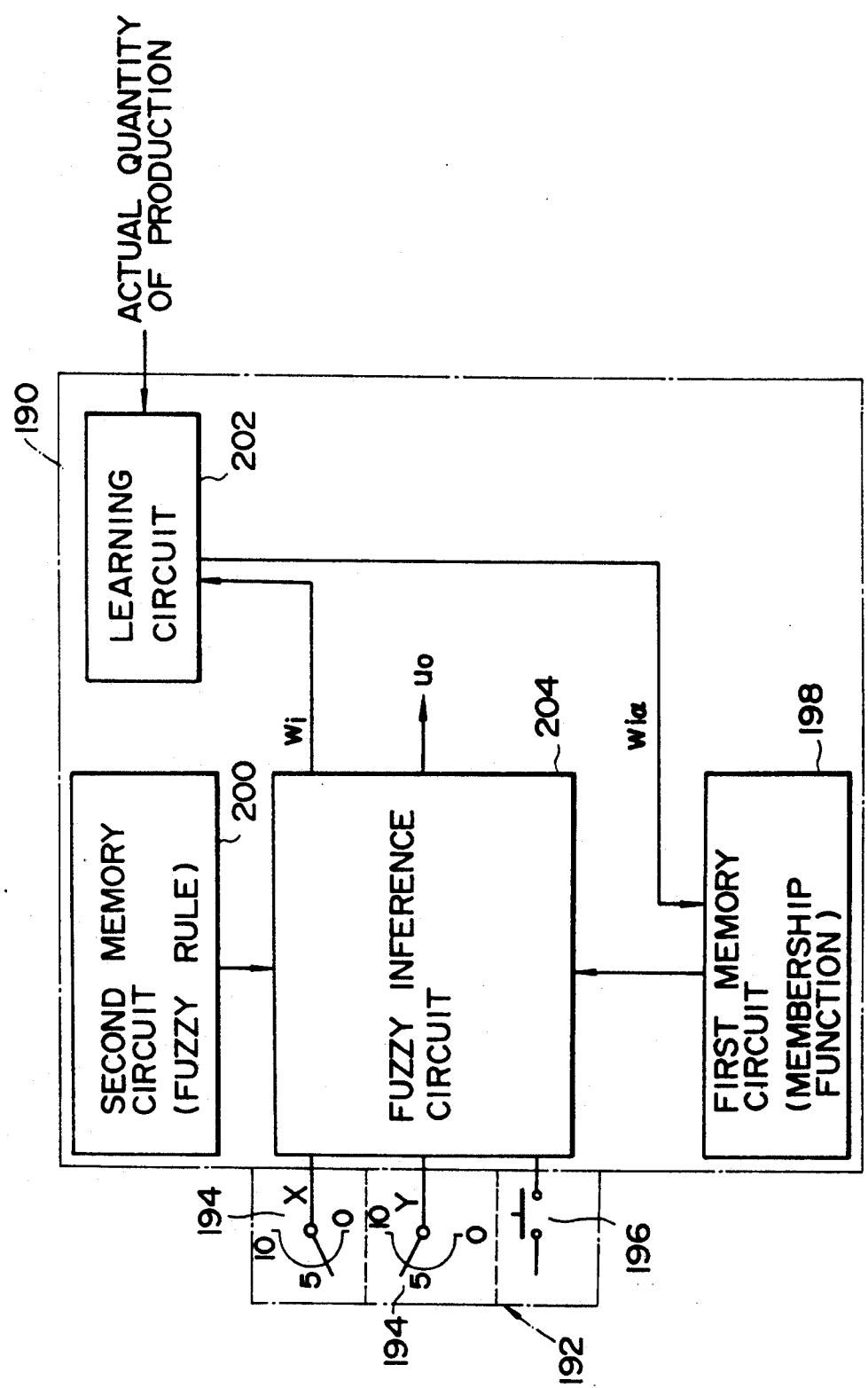
FIG. 9 is a block diagram showing another embodiment of the fuzzy controller.

A fuzzy controller 190 shown in FIG. 9 uses a sense value X of the weaving machine stop level to the effect that this weaving machine is small in weaving machine level, and another sense level Y of the rate to the effect that if the rotational frequency of this weaving machine is increased, this weaving machine will be small in rate of the change value of the weaving machine stop level with respect to the variation of the rotational frequency, as the evaluation index representing the running condition level of the weaving machine. As the sense values X and Y, other concepts such as too small or too large will do.

An input unit 192 connected to the fuzzy controller 190 includes a plurality of setters 194 for respectively setting the sense values X and Y manually, and a switch 196 for commanding the start of the operation. Each of the sense values X and Y is defined as a desired value ranging from 0 to 10, wherein each sense value is defined as 0 when it is small, each sensual value is defined as 5 when it can not be said that it is small or large, and each sense value is defined as 10 when it is large, for example.

The fuzzy controller 190 is provided with a first memory circuit 198, in which a plurality of membership functions B, M, S, PB, PM, PS, ZE, NS, NM and NB as shown in FIG. 10 are stored, a second memory circuit 200, in which a plurality of fuzzy rules $R_1$ through $R_9$ are stored, a learning circuit 202 for correcting the membership functions B, M, S, PB, PM, PS, ZE, NS, NM and NB, and a fuzzy inference circuit 204 for obtaining the rotational frequency $u_0$ to be varied on the basis of the sense values set in the input unit 192 and each information stored in the first and second memory circuits 198 and 200.

Figure 10A:
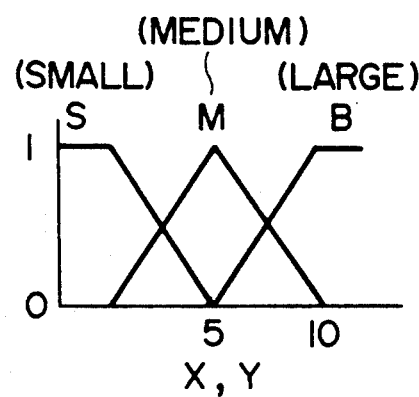
FIGS. 10(A) and 10(B) are graphs showing an embodiment of the membership function used for the fuzzy controller shown in FIG. 9.

As shown in FIG. 10(A), the membership functions B, M and S are respectively defined as the functions corresponding to the respective languages to the effect that each of the sense values X and Y is large (large), it can not be said that each sense value is large or small (medium) and each sense value is small (small), and also represent the certainty, in which each sense value belongs to the set of each language. These membership functions B, M and S are used for the inference of matching of the set sense values X and Y to the antecedent of each fuzzy rule. In the illustrated embodiment, the membership functions B, M and S are stored so that they may be used in common for each of the sense values X and Y, while they may be stored every one sense value X or Y. In the latter case, these membership functions B, M and S may be defined as values different from each other concerning each sense value X or Y.

Figure 10B:
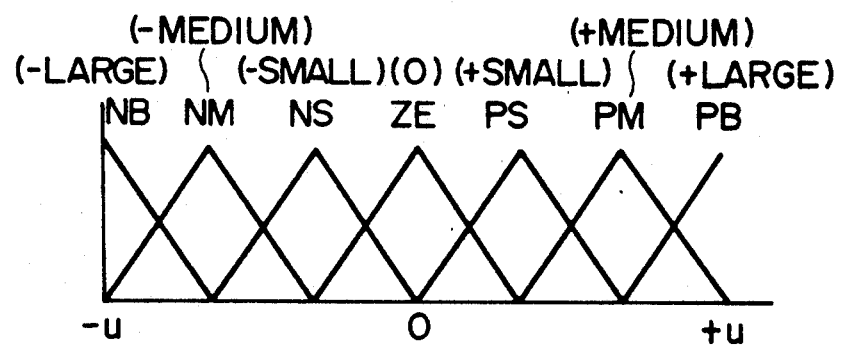

On the other hand, as shown in FIG. 10(B), the membership functions PB, PM, PS, ZE, NS, NM and NB are respectively defined as the functions corresponding to the respective languages to the effect that largely increase the rotational frequency (+large), increase the rotational frequency (+medium), slightly increase the rotational frequency (+small), slightly reduce the rotational frequency (−small), reduce the rotational frequency (−medium) and largely reduce the rotational frequency (−large), and also represent the certainty, in which the rotational frequency to be varied belongs to the set of each language. These membership functions PB, PM, PS, ZE, NS, NM and NB are used when inferring the consequent of each fuzzy rule on the basis of the matching as noted above.

The fuzzy rules $R_1$ through $R_9$ are respectively as follows:

$R_1$: If the sense value X is small (S), and the sense value Y is small (S), then largely increase the rotational frequency N of the weaving machine (PB).

$R_2$: If the sense value X is small (S), and it may be not said that the sense value Y is large or small (M), then increase the rotational frequency N of the weaving machine (PM).

$R_3$: If the sense value X is small (S), and the sense value Y is large (B), then slightly increase the rotational frequency N of the weaving machine (PS).

$R_4$: If it can not be said that the sense value X is either large or small (M), and the sense value Y is small (S), then increase the rotational frequency N of the weaving machine (PM).

$R_5$: If it can not be said that both of the sense values X and Y are large or small (M), then slightly increase the rotational frequency N of the weaving machine (PS).

$R_6$: If it can not be said that the sense value X is either large or small (M), and the sense value Y is large (B), then substantially maintain the present condition of the rotational frequency N of the weaving machine (ZE).

$R_7$: If the sense value X is large (B), and the sense value Y is small (S), then slightly increase the rotational frequency N of the weaving machine (PS).

$R_8$: If the sense value X is large (B), and it can not be said that the sense value Y is large or small (M), then substantially maintain the present condition of the rotational frequency N of the weaving machine (ZE).

$R_9$: If both of the sense values X and Y are large (B), then reduce the rotational frequency N of the weaving machine (NS).

This embodiment does not use the membership functions NM and NB.

Figure 11:
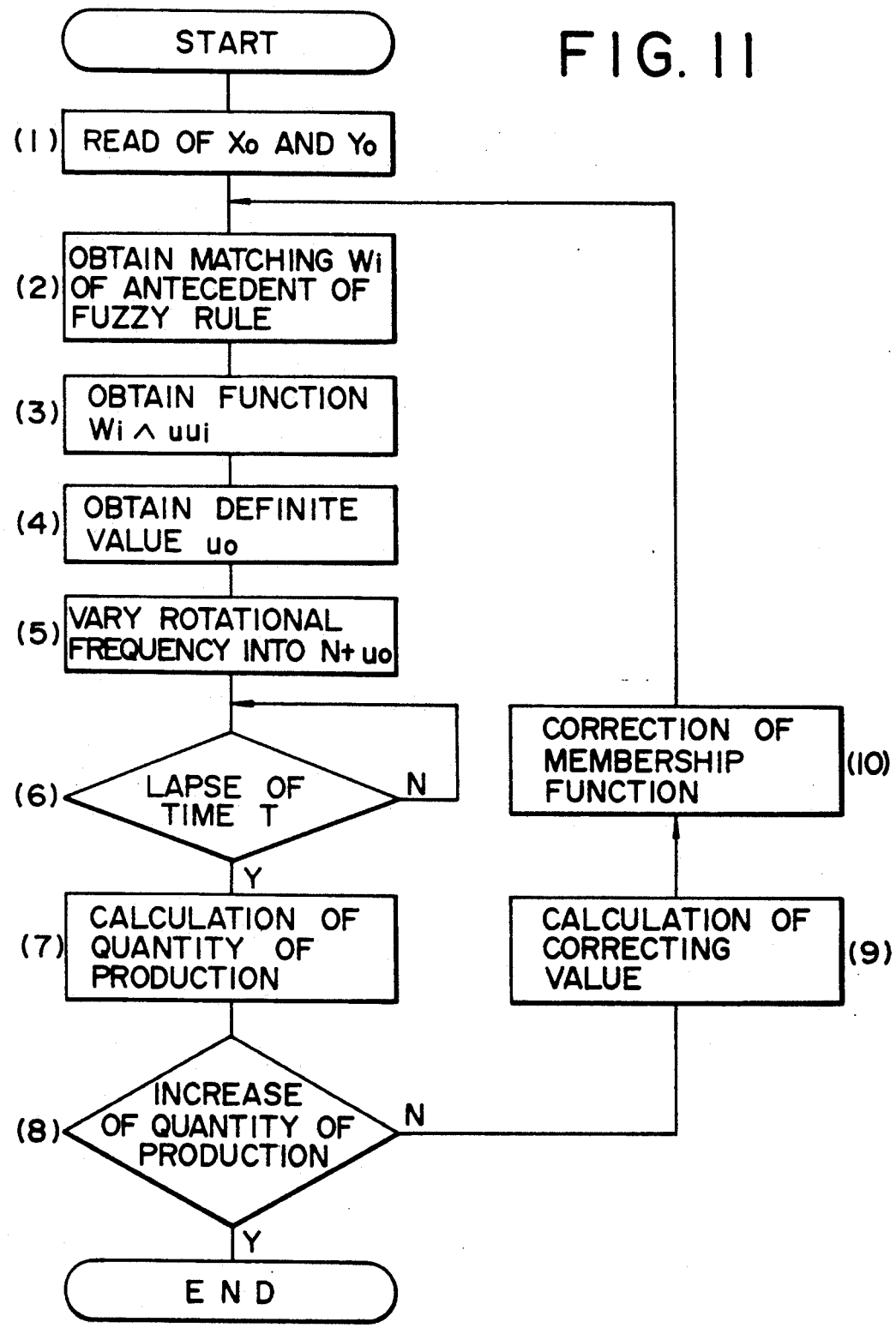
FIG. 11 is a flow chart for explaining the operation of the fuzzy controller shown in FIG. 9.

Next will be explained the operation of the fuzzy controller 190 with reference to FIG. 11.

When the switch 196 is pushed, the fuzzy controller 190 first reads the sense values X and Y set in the setters 194 (Step 1).

Next, the fuzzy controller 190 obtains the degree of matching $w_1$ through $w_9$ of the sense values X and Y to the antecedent of each of the fuzzy rules $R_1$ through $R_9$ for each fuzzy rule by the use of the read out sense values X and Y, the membership functions B, M and S stored in the first memory circuit 198 and the fuzzy rules $R_1$ through $R_9$ stored in the second memory circuit 200 (Step 2).

Then, the fuzzy controller 190 infers the consequent of each of the fuzzy rules $R_1$ through $R_9$, i.e., each of the functions $w_1 \lambda \mu U_1$ through $w_9 \lambda \mu U_9$ for each fuzzy rule by the use of the obtained degree of matching $w_1$ through $w_9$, the membership functions PB, PM, PS, ZE, NS, NM and NB stored in the first memory circuit 198 and the fuzzy rules $R_1$ through $R_9$ stored in the second memory circuit 200 (Step 3).

Each of the degrees of matching $w_1$ through $w_9$ and each of the functions $w_1 \lambda \mu U_1$ through $w_9 \lambda \mu U_9$ are obtained as shown in FIGS. 12(A) through 12(I). First, referring to each of the fuzzy rules $R_1$ through $R_9$, the degree of matching of values $x_0$ and $y_0$ of the set evaluation indexes X and Y to the membership functions B, M and S set for the antecedent corresponding to the evaluation indexes X and Y is obtained, and the common portion of the respective degrees of matching, i.e., the minimum degree of matching is cut by the degree of matching $w_i$ relative to the antecedent of the pertinent fuzzy rule, so that the apex of the membership function is made to coincide with the degree of matching $w_i$ to obtain the minimum value (common portion) of the degree of matching $w_i$ and the membership function. Thus, the functions $w_1 \lambda \mu U_1$ through $w_9 \lambda \mu U_9$ in the respective fuzzy rules $R_1$ through $R_9$ are inferred.

Next, the fuzzy controller 190 obtains the composite membership function, i.e., the fuzzy set $\mu U(u)$ composed of the obtained functions $w_1 \lambda \mu U_1$ through $w_9 \lambda \mu U_9$ through the superposition as shown in FIG. 12(J), and thereafter obtains a value of the center of mass of the fuzzy set $\mu U(u)$ to obtain the rotational frequency $u_0$ to be varied, i.e., a definite value $u_0$ (Step 4).

The fuzzy set $\mu U(u)$ and the definite value $u_0$ are respectively obtained by each of the aforementioned formulae (1) and (2). In this case, i in the formula represents an integer ranging from 1 to 9.

Next, the fuzzy controller 190 supplies to the rotation controller a signal which makes the rotational frequency of the weaving machine to vary from the actual rotational frequency N by the definite value $u_0$ (Step 5). Accordingly the rotation controller controls the motor for the main shaft such that the rotational frequency of the weaving machine results in $N + u_0$.

After the lapse of a predetermined period of time T, the fuzzy controller 190 calculates the quantity of production per unit hour, and confirms the variation of the quantity of production per unit hour (Steps 6, 7 and 8). If the quantity of production is increased, the operation of varying the rotational frequency is completed.

However, if the quantity of production is not increased, the fuzzy controller 190 translates the membership functions PB, PM, PS, ZE, NS, NM and NB stored in the first memory circuit 198 by a predetermined value (Steps 9 and 10) and thereafter, executes respective Steps 2 through 8.

In the correction of the membership functions PB, PM, PS, ZE, NS, NM and NB, these membership functions are translated along the abscissa by a certain value according to the way similar to that of the fuzzy controller 80.

In using the fuzzy controller 190, instead of the execution of Steps 9 and 10, the rotational frequency of the weaving machine may be corrected by an amount less than the definite value $u_0$, for example, by the half in the inverse relation (negative or positive) to the correcting direction (positive or negative) in Step 5. Further, after the execution of Step 10, instead of the repetition of Steps 2 through 8, after the operation of varying the rotational frequency is completed, and then the operator confirms with the display monitor as to whether or not the quantity of production is increased, the operator may operate again the switch 196 after the correction of the membership functions.

In the fuzzy controller 190 as shown in FIG. 9, instead of two kinds of sense values X and Y as noted above, a sense value representing the quality of the weaving machine stop level, i.e., the weaving machine stop level is good or bad, and another sense value representing the quality of the operating rate, i.e., the operating rate of the weaving machine is good or bad may be used as the evaluation indexes. In this case, the membership functions B, M and S are defined as the functions corresponding to the respective languages to the effect that the quality of the weaving machine stop level or the operating rate is large, medium and small, while the membership functions PB, PM, PS, ZE, NS, NM and NB are defined as the fuzzy sets respectively representing: largely increase the rotational frequency $u_0$ to be varied (+large); increase the rotational frequency $u_0$ (+medium); slightly increase the rotational frequency $u_0$ (+small); maintain the rotational frequency $u_0$ (0); slightly reduce the rotational frequency $u_0$ (−small); reduce the rotational frequency $u_0$ (−medium); and largely reduce the rotational frequency $u_0$ (−large). Further, the sense value representing the quality of the weaving machine stop level and the sense value representing the quality of the operating rate are respectively defined as a desired value ranging from 0 to 10, wherein when the sense value is small (good), this sensual value is defined as 0, when it can not be said that the sense value is small (good) or large (bad), this sense value is defined as 5, and when the sense value is large (bad), this sense value is defined as 10, for example.

Next will be explained a further embodiment of the fuzzy controller.

A fuzzy controller 210 as shown in FIG. 13 uses the standard stop level $X_0$, the standard operating rate $Y_0$, the present weaving machine stop level X and the present operating rate Y as the evaluation indexes in consideration of the fact that generally in the textile factory, the standard stop level and the standard operating rate are determined to control the weaving machine.

The standard stop level $X_0$ and the standard operating rate $Y_0$ are set in an input unit 212 connected to the fuzzy controller 210. On the other hand, the present weaving machine stop level X and the present operating rate Y respectively use the stop level and the operating rate output from the operation monitor 92 shown in FIG. 1. However, the present weaving machine stop level X and the present operating rate Y may be manually set in the input unit 212.

The input unit 212 includes a plurality of setters 214 for manually setting the standard weaving machine stop level $X_0$ and the standard operating rate $Y_0$, and a switch 216 for commanding the start of the operation.

Figure 14A:
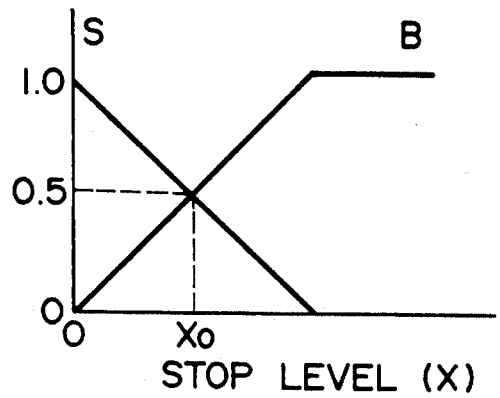
FIGS. 14(A) to 14(C) are graphs showing an embodiment of the membership function used for the fuzzy controller shown in FIG. 13.
Figure 14B:
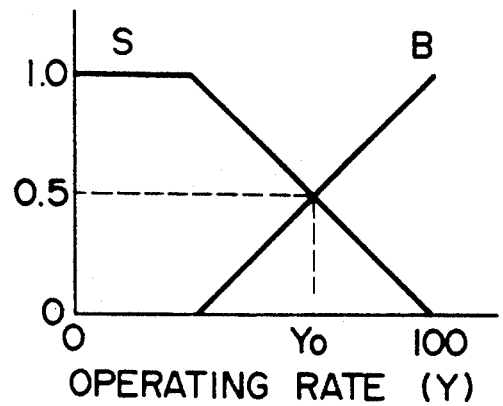

The fuzzy controller 210 is provided with a first memory circuit 218, in which the membership functions B and S for use of the stop level X shown in FIG. 14(A), the membership functions B and S for use of the operating rate shown in FIG. 14(B) and the membership functions P, Z and N for inferring the definite value $u_0$, a second memory circuit 220, in which a plurality of fuzzy rules $R_1$ through $R_4$ are stored, a learning circuit 222 for correcting the respective membership functions, and a fuzzy inference circuit 224 for obtaining the rotational frequency $u_0$ to be varied on the basis of each information stored in the first and second memory circuits 218 and 220, the standard values $X_0$ and $Y_0$ set in the input unit 212 and each information input from the operation monitor 92 shown in FIG. 1.

The membership functions B and S are defined as the functions respectively corresponding to the respective languages to the effect that the weaving machine stop level or the operating rate is large and small, while the membership functions P, Z and N are defined as the functions corresponding to the respective languages to the effect that increase the rotational frequency, substantially maintain the present condition of the rotational frequency and reduce the rotational frequency.

The membership functions B and S for use of the stop level X shown in FIG. 14(A) are corrected such that the certainty, in which the standard stop level $X_0$ belongs to each of the functions B and S results in 0.5. Similarly, the membership functions B and S for use of the operating rate Y as shown in FIG. 14(B) are also corrected such that the certainty, in which the standard operating rate $Y_0$ belongs to each of the functions B and S results in 0.5. These membership functions B and S are used for the inference of the degree of matching of the actual stop level X and the actual operating rate Y to the antecedent of each fuzzy rule.

Figure 14C:
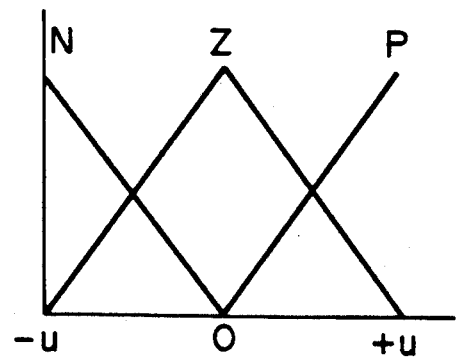

On the other hand, the membership functions P, Z and N shown in FIG. 14(C) are used for inferring the consequent of each fuzzy rule on the basis of the matching.

The fuzzy rules $R_1$ through $R_4$ are respectively as follows:

$R_1$: If both of the stop level X and the operating rate Y are small (S), then substantially maintain the present condition of the rotational frequency N of the weaving machine (Z).

$R_2$: If the stop level X is small (S), and the operating rate Y is large (B), then increase the rotational frequency N of the weaving machine (P).

$P_3$: If the stop level X is large (B), and the operating rate Y is small (S), then reduce the rotational frequency N of the weaving machine (N).

$R_4$: If both of the stop level X and the operating rate Y are large (B), then substantially maintain the present condition of the rotational frequency N of the weaving machine (Z).

Next will be explained the operation of the fuzzy controller 210 with reference to FIG. 15.

When the switch 216 is operated, the fuzzy controller 210 first reads the standard stop level $X_0$ and the standard operating rate $Y_0$ set in the respective setters 214 (Step 1), and then forms the membership functions on the basis of the input standard stop level $X_0$ and standard operating rate $Y_0$ (Step 2). The membership functions are formed by correcting the functions B and S shown in FIGS. 14(A) and 14(B) such that the input standard stop level $X_0$ and standard operating rate $Y_0$ match with the corresponding functions B and S shown in FIGS. 14(A) and 14(B) at 0.5.

Next, the fuzzy controller 210 reads the present stop level X and the present operating rate Y (Step 3), and obtains the degrees of matching $w_1$ through $w_4$ of the stop level X and the operating rate Y to the respective antecedents of the fuzzy rules $R_1$ through $R_4$ for each fuzzy rule by reading out present stop level X and present operating rate Y, the membership functions B and S stored in the first memory circuit 218 and the fuzzy rules $R_1$ through $R_4$ stored in the second memory circuit 220 (Step 4).

Then, the fuzzy controller 210 infers the consequents of the fuzzy rules $R_1$ through $R_4$, i.e., the functions $w_1\lambda\mu U_1$ through $w_4\lambda\mu U_4$ for each fuzzy rule by using the obtained degrees of matching $w_1$ through $w_4$, the membership functions P, Z and N stored in the first memory circuit 218 and the fuzzy rules $R_1$ through $R_4$ stored in the second memory circuit 220 (Step 5).

Then, the fuzzy controller 210 obtains the composite membership function, i.e., the fuzzy set $\mu U(u)$ composed of the obtained functions $w_1\lambda\mu U_1$ through $w_4\lambda\mu U_4$, and thereafter obtains a value of the center of mass of the fuzzy set $\mu U(u)$ to obtain the rotational frequency to be varied, i.e., the definite value $u_0$ (Step 6).

The fuzzy set $\mu U(u)$ and the definite value $u_0$ can be respectively obtained by the aforementioned formulae (I) and (II). In this case, i in each formula represents an integer ranging from 1 to 4.

Then, the fuzzy controller 210 supplies to the rotation controller a signal which makes the rotational frequency of the weaving machine vary from the present rotational frequency N by the definite value $u_0$ (Step 6). Accordingly, the rotation controller controls the motor for the main shaft such that the rotational frequency of the weaving machine results in $N+u_0$.

After the lapse of a predetermined period of time T, the fuzzy controller 210 calculates the quantity of production per unit hour, and confirms the variation of the quantity of production per unit hour. If the quantity of production per unit hour is increased, the operation of varying the rotational frequency is completed (Step 9).

However, if the quantity of production per unit hour is not increased, the fuzzy controller 210 sets the definite value $u_i$ so as to come to a half of $u_0$ (Step 10). If the definite value $u_i$ is equal with 0, the operation of varying the rotational frequency is completed (Step 11). However, the definite value $u_i$ is not equal with 0, the fuzzy controller 210 executes again Steps 7 through 9.

The fuzzy controller 210 may be constructed such that the membership functions P, Z and N stored in the second memory circuit 220 are translated by a predetermined value in Steps 10 and 11, then Steps 3 though 9 are performed. In this case, the correction of the membership functions is done by translating each membership function along the abscissa by a fixed value according to the method similar to that of the fuzzy controller 80.

Since the respective embodiments as noted above use a plurality of evaluation indexes, it is possible to obtain the optimum rotational frequency which satisfies these evaluation indexes. According to the present invention, it is also possible to use any one of these evaluation indexes.

In the respective embodiments as noted above, instead of inputting the operating command to the fuzzy controller in response to the operation of the switch, the operation of varying the rotational frequency may be executed periodically. Further, a value of the setter for setting the evaluation indexes may be varied only by the operator who posseses the particular key. Also, since the same working allowance level of one operator is set for all weaving machines controlled by this operator, the working allowance level of the operator used as the evaluation index is preferably used in common for a plurality of weaving machines controlled by one operator. Furthermore, preferably, each membership function for use in the fuzzy inference is variably set.

What is claimed is:

1. A method for controlling a rotational frequency of a weaving machine utilizing a fuzzy inference, comprising the steps of:

selecting at least one evaluation index to represent a running condition level of said weaving machine, said evaluation index being selected from a group of parameters that includes a control allowance level of said weaving machine, a quality allowance level of a woven fabric, a working allowance level of an operator of said weaving machine, a stop level of said weaving machine, a rate of change value of said weaving machine stop level with respect to a variation value of said weaving machine rotational frequency, and an operating rate of said weaving machine;

setting said at least one selected evaluation index in a setter, said setter being interconnected to said weaving machine;

determining said variation value of said weaving machine rotational frequency utilizing said fuzzy inference on the basis of said at least one selected and set evaluation index; and varying an actual rotational frequency of said weaving machine on the basis of said rotational frequency variation value determined by fuzzy inference.

2. A method according to claim 1, further comprising the step of selecting said working allowance level of an operator of said weaving machine to be said at least one selected evaluation index and setting said selected operator working allowance level evaluation index in said setter, said setter being further interconnected in common to at least one other weaving machine operated by said operator.

3. A method according to claim 1, further comprising the steps of:

obtaining a variation value of a quantity of production per unit hour after said actual rotational frequency is varied; and correcting a membership function for use in said fuzzy inference in the event said quantity of production per unit hour is decreased based on said obtained variation value.

4. A method according to claim 1, further comprising the steps of:

obtaining a variation value of a quantity of production per unit hour after said actual rotational frequency is varied;

correcting a membership function for use in said fuzzy inference in the event said quantity of production per unit hour is decreased based on said obtained variation value;

again determining a variation value of said weaving machine rotational frequency utilizing said fuzzy inference on the basis of said corrected membership function; and again varying said actual rotational frequency of said weaving machine on the basis of said redetermined rotational frequency variation value.

5. A method for controlling a rotational frequency of a weaving machine utilizing a fuzzy inference, comprising the steps of:
- calculating at least one evaluation index on the basis of a weaving machine rotational angle signal, a weaving machine stop signal, and a weaving machine running signal, said at least one evaluation index representing a running condition level of said weaving machine;
- determining a variation value of said weaving machine rotational frequency utilizing said fuzzy inference on the basis of said calculated evaluation index; and
- varying an actual rotational frequency of said weaving machine on the basis of said rotational frequency variation value determined by fuzzy inference.

6. A method according to claim 5, further comprising the steps of:
- obtaining a variation value of a quantity of production per unit hour after said actual rotational frequency is varied; and
- correcting a membership function for use in said fuzzy inference in the event said quantity of production per unit hour is decreased based on said obtained variation value.

7. A method according to claim 5, further comprising the steps of:
- obtaining a variation value of a quantity of production per unit hour after said actual rotational frequency is varied;
- correcting a membership function for use in said fuzzy inference in the event said quantity of production per unit hour is decreased based on said obtained variation value;
- again determining a variation value of said weaving machine rotational frequency utilizing said fuzzy inference on the basis of said corrected membership function; and
- again varying said actual rotational frequency of said weaving machine on the basis of said redetermined rotational frequency variation value.

8. An apparatus for controlling a rotational frequency of a weaving machine utilizing a fuzzy inference, said apparatus comprising:
- means for setting at least one selected evaluation index representing a running condition level of said weaving machine, said evaluation index being selected from a group of parameters that includes a control allowance level of said weaving machine, a quality allowance level of a woven fabric, a working allowance level of an operator, a stop level of said weaving machine, a rate of change value of said weaving machine stop level with respect to a variation value of said weaving machine rotational frequency, and an operating rate of said weaving machine;
- fuzzy inference means interconnected to said means for setting at least one selected evaluation index, for determining said variation value of said weaving machine rotational frequency, said variation value determined utilizing said fuzzy inference on the basis of said at least one selected and set evaluation index; and
- means for varying an actual rotational frequency of said weaving machine on the basis of said rotational frequency variation value determined by fuzzy inference.

9. An apparatus according to claim 8, wherein said fuzzy inference means further includes a circuit for obtaining a variation value of a quantity of production per unit hour and correcting a membership function on the basis of said obtained variation value.

10. An apparatus for controlling a rotational frequency of a weaving machine utilizing a fuzzy inference, said apparatus comprising:
- means for calculating at least one evaluation index representing a running condition level of said weaving machine, said evaluation index being calculated on the basis of a weaving machine rotational angle signal, a weaving machine stop signal, and a weaving machine running signal;
- fuzzy inference means for determining a variation value of said weaving machine rotational frequency, said variation value determined utilizing said fuzzy inference on the basis of said calculated evaluation index; and
- means for varying an actual rotational frequency of said weaving machine on the basis of said rotational frequency variation value determined by fuzzy inference.

11. An apparatus according to claim 10, wherein said fuzzy inference means further includes a circuit for obtaining a variation value of a quantity of production per unit hour and correcting a membership function on the basis of said obtained variation value.

* * * * *

UNITED STATES PATENT AND TRADEMARK OFFICE
CERTIFICATE OF CORRECTION

PATENT NO. : 5,134,568

DATED : July 28, 1992

INVENTOR(S) : Sainen

It is certified that error appears in the above-identified patent and that said Letters Patent is hereby corrected as shown below:

On the title page:

At INID Sec. 54, please insert --A-- prior to "WEAVING".

At INID Sec. 57, line 4, please change "interference" to --inference--.

At col. 1, line 2, please insert --A-- prior to "WEAVING".

At col. 2, line 5, please delete "." after "frequency".

At col. 6, line 2, please delete "not" at its second occurrence;
   at line 3, please insert --not-- after "or"; and
   at line 6, please delete "use is also made of".

At col. 9, line 36, after "FIG. 7", please insert --, whereas--.

At col. 10, line 7, please delete "$\theta$" after "signal" and insert --$\theta_o$-- after "reference angle".

At col. 11, line 36, please insert --take-- prior to "into".

UNITED STATES PATENT AND TRADEMARK OFFICE
CERTIFICATE OF CORRECTION

PATENT NO. : 5,134,568
DATED : July 28, 1992
INVENTOR(S) : Sainen

It is certified that error appears in the above-indentified patent and that said Letters Patent is hereby corrected as shown below:

At col. 16, line 52, please change "$P_3$" to --$R_3$--.

Signed and Sealed this

Fifteenth Day of March, 1994

Attest:

BRUCE LEHMAN

Attesting Officer     Commissioner of Patents and Trademarks